Aug. 5, 1969     R. T. BURNS     3,458,902

EXTRUSION APPARATUS FOR THERMOPLASTIC MATERIALS

Filed July 28, 1967

ROBERT T. BURNS
INVENTOR.

BY *Edward L. Bell*

ATTORNEY

United States Patent Office 3,458,902
Patented Aug. 5, 1969

3,458,902
EXTRUSION APPARATUS FOR THERMOPLASTIC MATERIALS
Robert T. Burns, Wilmington, Del., assignor to Hercules Incorporated, Wilmington, Del., a corporation of Delaware
Filed July 28, 1967, Ser. No. 656,732
Int. Cl. B29f 3/04
U.S. Cl. 18—12                                          2 Claims

ABSTRACT OF THE DISCLOSURE

This invention relates to an extruder and particularly to an extruder for making foamable thermoplastic pellets, and is characterized by a smooth flow path for the extrudate from the extruder screw through the die whereby there are no pockets in which the extrudate can hang up. The smooth flow path is obtained by an extension disposed in the gap that is normally present between the end of the extruder screw and the die and by flaring the input end of the die holes to encompass the entire area at the output end of the extruder.

---

The present invention relates to apparatus for extruding strans of thermoplastic materials and particularly to extrusion apparatus especially adapted for making foamable pellets of thermoplastic materials.

The objects of this invention are to provide extrusion apparatus especially suited for making foamable pellets of thermoplastic material, which apparatus is simple and easy to opearte, efficient, reliable and durable, economical, and constitutes a minimum of modification from existing apparatus.

Briefly, the objects of this invention have been achieved by closing the space that is normally present in a plastic extruder between the end ofthe extruder screw and the die and thereby reducing the extrusion path to a smooth continuation of the annular space between the root periphery of the extruder screw and the bore in the barrel of the extruder. In addition, the die is provided with die holes having input ends opening into the annular space and flared laterally to intersect the input end of the adjacent die holes and the end of the root periphery of the screw and the wall of the bore in the barrel so that the entire path for the extrudate presents a smooth and direct flow to the die holes without interfering flat surfaces or pockets in which extrudate could be delayed. In this manner, the residence time of all portions of the extrudate in the extruder, and particualry in the discharge end of the extruder, is maintained at a minimum. After extrusion in the form of strands through the die holes, the strands are cooled and chopped into pellets. In the usual extruder operation with a foamable material, the heat begins to activate the foaming agent to produce a foamed or partially-foamed pellet rather than a foamable pellet. The longer the material remains at its melt temperature in the extruder, the greater will be the foaming action. With flat surfaces or pockets that cause some portions of the material to hang-up in the extruder, the residence time of that material may be great enough to activate completely the blowing agent in that portion of the material. Therefore, one of the principal advantages of an extruder in accordance with this invention is that with a foamable mixture, there is very little activation of the foaming agent in the extruder.

With the above and other objects in view, the present invention is hereinafter disclosed with reference to the accompanying drawings, in which.

Figure 1:
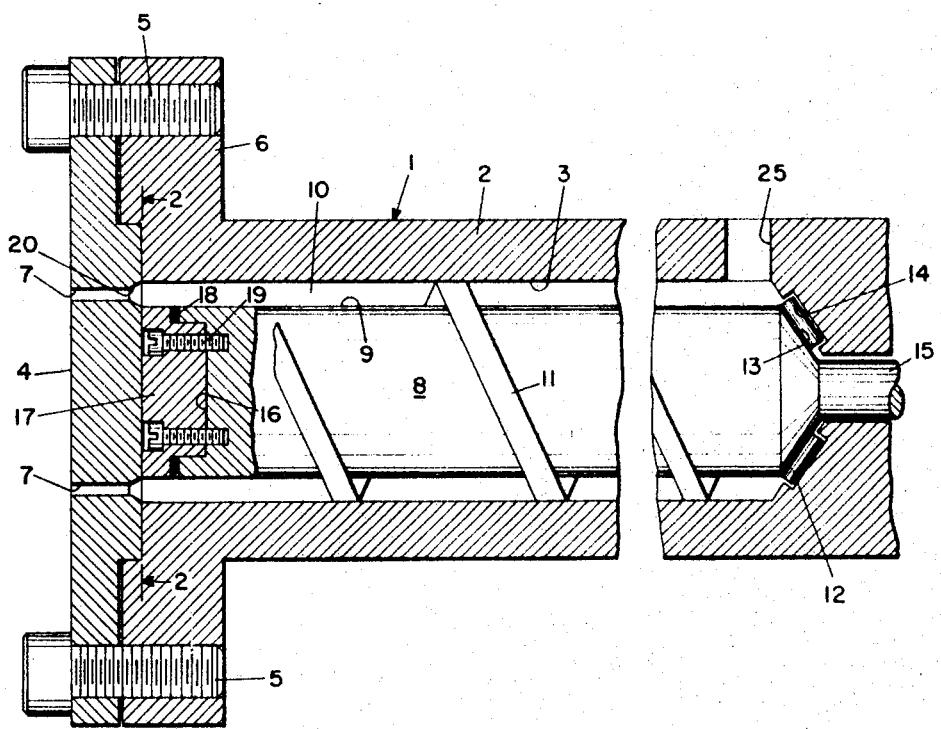
FIG. 1 is a fragmentary sectional view longitudinally of an extruder embodying the present invention.
Figure 2:
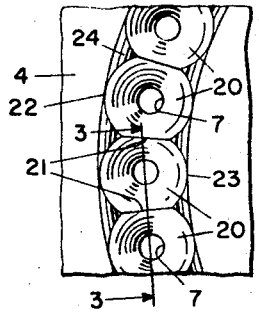
FIG. 2 is a fragmentary sectional view taken substantially along the line 2—2 of FIG. 1.
Figure 3:
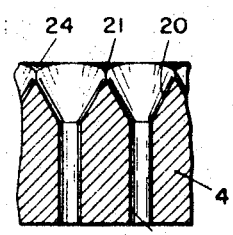
FIG. 3 is a fragmentary sectional view taken substantially along the line 3—3 of FIG. 2.

With reference to the drawings, the present invention is disclosed as embodied in an extruder 1 having an extruder barrel 2 with a cylindrical bore 3. The output end of the barrel 2 is closed by a die plate 4 secured as by screws 5 that are threaded into a flange 6 extending laterally from the die end or output end of the barrel 2. The die plate 4 is provided with a circularly arranged series of die holes 7 through which the extrudate is forced in the form of strands.

Disposed concentrically within the bore 3 of the barrel 2 is an extruder screw 8 having a root periphery 9, the diameter of which is less than the diameter of the bore 3 to provide an annular space 10 that has a radial width larger, e.g., twice as large, as the diameter of the bore holes 7. A thread 11 progresses along the root periphery 9 from substantially one end of the screw 8 to the other. The thread 11 has a maximum diameter that fits with a close tolerance into the bore 3 of the barrel 2, and is wound in the direction to advance toward the die end of the screw upon rotation of the screw in the designed direction.

At the input end of the barrel 2, the screw 8 is held against endwise movement in the direction away from the die plate 4 by a thrust bearing means diagrammatically illustrated by the thrust bearings 12 disposed between a shoulder 13 on the screw 8 and on opposed shoulder 14 of the barrel 2. The shoulder 13 on the screw is formed between the root periphery 9 and a reduced end 15 of the screw that extends outwardly of the barrel 2 and is adapted to be driven to impart rotation in the designed direction to the screw 8.

The output end of the screw 8 terminates in an end face 16 that, in the usual manner, is spaced from the die plate 4 to provide a gap between the end face 16 and the die plate 4. In accordance with this invention, this gap is closed by an extension 17 secured to the end face 16 of the screw 8 as by screws 19. The extension 17 may be accurately positioned radially by recessing the end face 16 of the screw 8 as shown and endwise by shims 18. When properly adjusted, the extension 17 abuts against the inner face of the die plate 4 when the extruder is in operation. The extension 17 has a diameter that is substantially the same as the root periphery 9 of the screw 8 so that the extension 17 constitutes a smooth continuation of the root periphery 9 of the screw 8 and the annular space 10 thus continues smoothly to die plate 4.

The extension 17 is preferably made of a material that is somewhat compressible so that it may be slightly deformed under compression in its operating condition and thus sealed against the die plate 4. At the same time, the material must be able to withstand the extrusion temperatures without deterioration or excessive deformation. Inasmuch as the extension 17 has a sliding engagement with the die plate, it should also have a relatively low coefficient of friction. For the extrusion of strands of polypropylene which has a melt temperature of about 165° C., polytetrafluoroethylene is a preferred material for the extension 17 because of its heat tolerance, resilience and low friction characteristics.

The die holes 7 are arranged with the axes thereof in a circle substantially at the midpoint radially of the annular space 10. The input ends 20 of the die holes 7 are also flared outwardly to encompass the entire area on the die plate 4 that is exposed to the annular space 10 and without extending to any portion of the die plate 4 that is not exposed to the die plate 4. With the die holes 7 of a diameter that is for example equal to one-half the radial width of the space 10 as mentioned above, flaring of the input ends may be provided by forming the input ends 20 conically with the base of the cone at the interface between the die plate 4 and barrel 2 and having a diameter substantially equal to the radial width of the space 10. With closely spaced die holes 7, the input ends 20 of each adjacent pair of die holes 7 intersect along a sharp line 21. The input ends 20 are then ground away at an angle inclined inwardly toward the die holes 7 from an outer line 22 and an inner line 23 that are circular and substantially tangent to the innermost and outermost points on each of the input ends 20. Thus, the flat, wedge-shaped areas that would otherwise be present at the ends of the edges 21 are removed to provide inclined surfaces 24 beveled axially of the die plate 4 toward the die holes 7.

The line 23 corresponds substantially to the line of contact of the extension 17 on the die plate 4 while the line 22 corresponds substantially to the line of contact of the bore 3 of the barrel 2 on the die plate 4. Accordingly, the space between the lines 22 and 23 corresponds to the annular space 10 and, through the flaring and beveling, there is provided a smooth path for the extrudate from the annular space 10 into each of the die holes 7.

In operation, power is applied to the screw 8 through the reduced end 15 to rotate the same in the direction to cause the thread 11 to progress toward the die end thereof. Resin is fed into the annular space 10 at the input end of the extruder as through an input aperture 25. As the resin is advanced by the thread 11, it is melted by heat developed internally through the mechanical working of it and, if desired, by heat applied externally to the barrel 2. The die plate 4 may also be heated externally at the beginning of the extruder operation in accordance with known practice to avoid freezing the molten polymer in the die holes 7 and thus plugging the same. The molten polymer is throughly mixed as it is; moved along by the screw 8 and is forced to and through the die holes 7 from which it emerges as a strand. The strand is then cooled and chopped into pellets which can be used in an article forming operation.

In accordance with this invention, the resin input to the aperture 25 is preferably a mixture of a polymer and blowing agent so that the pellets that are formed are capable of foaming upon reheating to the actuation temperature of the blowing agent. The primary advantage of the apparatus when so used is that, because of the smooth and direct flow path for the extrudate, there are no pockets where the molten polymer may hang up. Such pockets would otherwise detain the trapped polymer which, because of the prolonged exposure to heat, not only additionally degrades the materials but also increasingly activates the blowing agent in the extruder to produce a foamed or partially foamed rather than a foamable pellet.

While the disclosed embodiment of the invention includes a single series of die holes 7, it will be apparent that two or more series of die holes could be used and that the input ends of the die holes could constitute a smoothly diverging continuation of the annular space 10 rather than a smoothly converging continuation as with the die holes 7.

What I claim and desire to protect by Letters Patent is:

1. An extruder for extruding a plurality of strands of thermoplastic material comprising a barrel having a cylindrical bore, a die plate closing one end of said barrel, an extruder screw mounted for rotation in the bore, said screw having a root periphery that is smaller than the bore to provide an annular space bewteen the same and having a thread on said root periphrey for advancing material along said annular space toward said die plate upon rotation of said screw, means for positioning said screw in the bore with the end face of said screw spaced from said die plate, and extension means for closing the space between said screw and die plate, said extension means having a periphery constituting a smooth continuation of the root periphery of said screw, said die plate having a plurality of die holes disposed with the axis thereof substantially at the midpoint radially of said annular space, said die holes having input ends that are inclined to encompass the entire area of said die plate between the lines on said die plate defined by said bore and by the periphery of said extension means whereby the input ends of said die holes constitute a smooth continuation of said annular space.

2. An extruder in accordance with claim 1 in which said extension means comprises an extension secured to the end face of said screw.

References Cited

UNITED STATES PATENTS 1,516,842 11/1924 Butterfield.
3,114,169 12/1963 Palmer et al.

FOREIGN PATENTS 220,049 7/1957 Australia.

WILLIAM J. STEPHENSON, Primary Examiner